(No Model.)
M. T. DENNE.
ROTARY CUTTER.
No. 579,701. Patented Mar. 30, 1897.
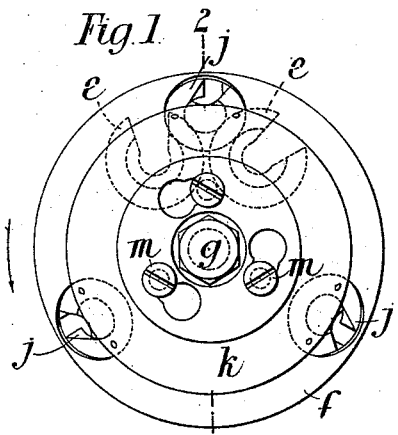
Fig. 1
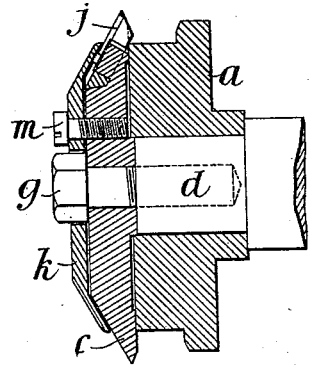
Fig. 2
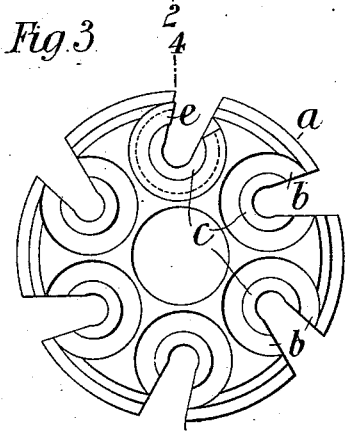
Fig. 3
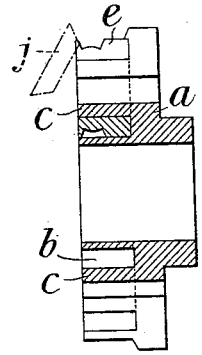
Fig. 4
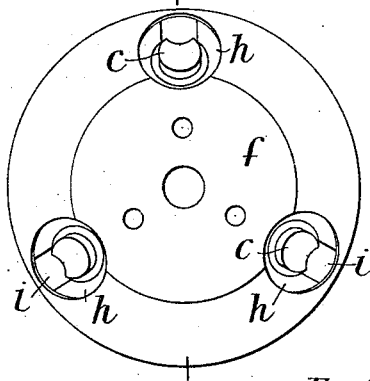
Fig. 5    Fig. 6
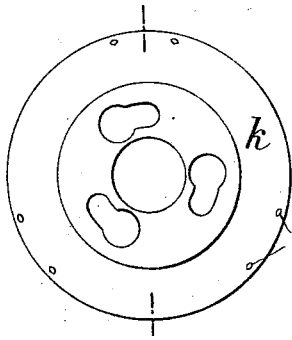
Fig. 9    Fig. 10
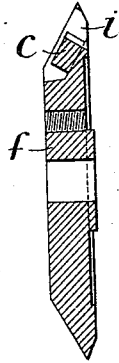
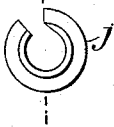
Fig. 7    Fig. 8
Witnesses
J. D. Kingsbury
P. Hubbard
Inventor
Mark Thomas Denne
By Whitaker & Prevost
Attys.

UNITED STATES PATENT OFFICE.

MARK THOMAS DENNE, OF BIRMINGHAM, ENGLAND, ASSIGNOR TO JOHN CAVE & SONS, OF RUSHDEN, ENGLAND.

ROTARY CUTTER.

SPECIFICATION forming part of Letters Patent No. 579,701, dated March 30, 1897.

Application filed July 25, 1896. Serial No. 600,507. (No model.)

*To all whom it may concern:*

Be it known that I, MARK THOMAS DENNE, a subject of the Queen of Great Britain, residing at Birmingham, England, have invented new and useful Improvements in Rotary Cutters, of which the following is a specification.

My invention relates to rotary cutters chiefly designed for trimming the edges of boot-soles, but also applicable for other purposes, and to that class of such cutters wherein a series of ring-shaped cutters proper, turned externally to suit the shape of the surfaces to be cut or trimmed and slotted longitudinally and radially to form cutting edges, are employed.

The object of my invention is to provide for working two or more sets of such cutters in combination when it is desired to cut surfaces for which a single cutter could not be conveniently constructed.

According to my invention I arrange on one side or on both sides of the main cutter-block a supplementary block carrying a series of cutters which coöperate with the cutters in the main block to produce the surface of the desired shape.

To enable my invention to be fully understood, I will describe the same as applied to a cutter for trimming the edges of the sole of a boot or shoe and also the welt-surface of such a sole.

In the accompanying drawings, Figure 1 is a face view of a cutter-block having two sets of cutters arranged in accordance with my invention; and Fig. 2 is a section on the line 2 2, Fig. 1. Fig. 3 is an elevation of the main cutter-block detached and having one cutter in position; and Fig. 4 is a section on the line 4 4, Fig. 3. Fig. 5 is an elevation of the supplementary cutter-block. Fig. 6 is a section on the line 6 6, Fig. 5. Figs. 7 and 8 are an elevation and section, respectively, of one of the supplementary cutters; and Figs. 9 and 10 are an elevation and section of a plate for clamping the supplementary cutters in position.

$a$ is the main cutter block or disk, having formed in it a series of annular recesses $b\ b$ with central pins $c\ c$, the said block being mounted upon a spindle, such as $d$, and secured against rotation thereon. $e$, Figs. 3 and 4, indicates one of the cutters for the main block, which cutter is shaped internally to fit the pins $c\ c$ and externally so that it will fit against the walls of the recesses $b\ b$, the cutter having a radial slot to form a cutting edge, and a part of the external periphery shaped to correspond with the surface to be trimmed.

It is to be understood that the recesses $b\ b$ are so formed that when the cutters are in position therein their peripheral surfaces will project slightly above the peripheral surface of the cutter-block. As shown in the drawings, the cutter-block is adapted to carry six cutters, but it will be obvious that a greater or less number may be employed.

$f$ is the supplementary block, which is fixed to the spindle $d$ by a screw $g$, and serves by pressing against the cutters $e\ e$ to hold them in their recesses. This supplementary block $f$ has formed in it a series of recesses $h\ h$, which recesses, in order that the cutters carried therein may coöperate with the cutters $e\ e$, are placed at an angle to the face of the block, as clearly shown in Figs. 2, 5, and 6, apertures $i\ i$ being formed through which the cutting edges of the cutters will project, as shown in Fig. 2. It will be understood that these recesses $h\ h$ are shaped internally to suit the cutters they are designed to receive and that they are each provided with a central pin $c$ upon which the cutters fit.

$j$, Figs. 7 and 8, indicates one of the supplementary cutters, which cutters, like the cutters $e\ e$, are ring-shaped and have radial slots to form the cutting edges.

In the drawings the supplementary block is represented as being provided with only three recesses for carrying three cutters, one of which is placed between each pair of main cutters $e\ e$, as will be readily understood by reference to Fig. 1.

It will be understood that the cutting edges of the supplementary cutters $j\ j$ are shaped so that they will properly coöperate with the main cutters $h\ h$. Fig. 4 will illustrate this, the dotted lines indicating the position which the edge of a cutter $j$ occupies relatively with a cutter $e$.

$k$ is the plate by means of which the cutters $jj$ are firmly clamped in position in their recesses, the said plate being provided with pins or projections $ll$, which bear upon the cutters. The plate $k$ is fixed to the supplementary block by screws $mm$.

Having now particularly described and ascertained the nature of my said invention and in what manner the same is to be performed, I declare that what I claim is—

1. The combination with the main cutter-block provided with annular recesses and annular slotted cutters in said recesses, of a supplementary cutter-block engaging the cutters of the main cutter-block and clamping them in position, and cutters secured to said supplementary cutter-block, substantially as described.

2. The combination with a main cutter-block having a series of radially-slotted cutters carried in annular recesses, of a supplementary block also carrying a series of annular slotted cutters which coöperate with the cutters in the main block, the said supplementary cutters being held in position by a clamping-plate, substantially as described.

3. The combination with the main cutter-block having a series of annular recesses, and cutters carried in said recesses, of a supplementary cutter-block, directly engaging said cutters, and clamping them between it and the main cutter-block, said supplementary block being also provided with annular recesses, and circular cutters in said recesses, and a clamping-plate engaging the cutters of the supplemental block and clamping them between it and said supplemental block and means for securing said parts together, substantially as described.

4. The combination with the main cutter-block having annular recesses therein and circular cutters in said recesses, of a supplemental cutter-block having portions engaging said cutters, means for securing said supplemental block to the main cutter-block to clamp the cutters in position, said supplemental block being also provided with annular recesses and supplemental circular cutters in said recesses, a clamping-plate having portions to engage said supplemental cutters and independent securing devices for securing said clamping-plate to the supplemental cutter-block for clamping said supplemental cutters in position, substantially as described.

MARK THOMAS DENNE.

Witnesses:
ERNEST HARKER,
ORLANDO C. POWER.